United States Patent
Clark

(10) Patent No.: US 10,789,338 B2
(45) Date of Patent: Sep. 29, 2020

(54) SOFTWARE ALGORITHM SECURITY

(71) Applicant: Carl M. Clark, Albuquerque, NM (US)

(72) Inventor: Carl M. Clark, Albuquerque, NM (US)

(*) Notice: Subject to any disclaimer, the term of this patent is extended or adjusted under 35 U.S.C. 154(b) by 0 days.

(21) Appl. No.: 16/393,564

(22) Filed: Apr. 24, 2019

(65) Prior Publication Data
US 2019/0251232 A1    Aug. 15, 2019

Related U.S. Application Data

(63) Continuation-in-part of application No. PCT/US2017/058051, filed on Oct. 24, 2017.

(60) Provisional application No. 62/412,167, filed on Oct. 24, 2016.

(51) Int. Cl.
| | | |
|---|---|---|
| *G06F 21/12* | (2013.01) | |
| *H04L 29/06* | (2006.01) | |
| *G06F 21/14* | (2013.01) | |
| *G06F 21/60* | (2013.01) | |

(52) U.S. Cl.
CPC ......... *G06F 21/125* (2013.01); *G06F 21/12* (2013.01); *G06F 21/14* (2013.01); *G06F 21/602* (2013.01); *G06F 2221/0704* (2013.01); *G06F 2221/0768* (2013.01)

(58) Field of Classification Search
CPC ..... H04L 9/0822; H04L 9/083; G06F 21/125; G06F 21/12; G06F 21/14; G06F 21/602; G06F 2221/0704; G06F 2221/0768
See application file for complete search history.

(56) References Cited

U.S. PATENT DOCUMENTS

| | | | |
|---|---|---|---|
| 2005/0246537 A1 | 3/2005 | Gunyakti et al. | |
| 2007/0143630 A1* | 6/2007 | Zunke | G06F 21/123 713/189 |
| 2009/0063868 A1 | 5/2009 | Granados et al. | |
| 2009/0165127 A1 | 6/2009 | Jung et al. | |
| 2009/0327737 A1* | 12/2009 | Hsu | H04L 63/12 713/181 |
| 2010/0287622 A1* | 11/2010 | Petkov | G06F 21/125 726/29 |
| 2010/0313188 A1* | 12/2010 | Asipov | G06F 21/125 717/139 |
| 2015/0235015 A1 | 8/2015 | Holler et al. | |

(Continued)

FOREIGN PATENT DOCUMENTS

WO    WO2018081093 A1    5/2018

*Primary Examiner* — Amir Mehrmanesh
(74) *Attorney, Agent, or Firm* — Nguyen Tarbet

(57) ABSTRACT

A computer-implemented system for providing security to a proprietary software algorithm is presented. The system, known as Software Algorithm Security ("SAS"), is a form of individual heuristic copy protection requiring a provable national origination to execute. The SAS completely encrypts a software algorithm's executable preamble, thereby making alteration of executable image logic close to impossible. Making use of the ability to safeguard a single executable image, Software Licensing Logic was designed to preamble software for licensing purposes. Each algorithm licensed could be tracked and reported if executed illegally, or hacked. Illegal execution would include not originating execution from a preset collective of land line phone numbers or attempting to execute the executable image outside the confines of a national boundary.

11 Claims, 10 Drawing Sheets

Continued in FIG. 1B

(56) References Cited

U.S. PATENT DOCUMENTS

2015/0278491 A1 10/2015 Horning et al.
2016/0252895 A1* 9/2016 Case .................... G05B 19/406
                                                                                                                          700/12

* cited by examiner

An encrypted preamble binary file is compiled by the licensing software engine and downloaded to the software licensee (Class 7 CPU).
201

The preamble binary file acquires and stores information identifying the Class 7 CPU as owner of the software license while residing on the Class 7 CPU.
202

The preamble binary file is then passed to a software developer (Class 1 CPU) where software algorithm development information is obtained and stored by the preamble, including the name, functional description and version number of the software algorithm.
203

An attempt to execute the software algorithm by a Class 3 CPU exposes the land line modem number of the Class 3 CPU. The preamble binary file then compares (or initially archives as acceptable/authorized) the number used as echoed back by the Class 2 CPU.
204

If the land line number is found to be authorized, then execution of the algorithm is permitted (unless overridden by a Class 2 CPU error code).
205

If the land line number fails to match the authorized number, three attempts are provided to enter the algorithm index before assuming the computer/algorithm has been stolen.
206

FIG. 2

An encryption library created to contain separate encryption technologies for each nation to prevent use of cross-compilers and hacking tools to reverse engineer software.
This technology also adds another signature to insure a nation's software only executes within its national boundaries.

301

Each end user executable image microprocessor PROM needs to auto-recognize the encrypted executable and decrypt it instruction by instruction, leaving the majority of software always encrypted, wherever it resides.
The software licensing engine and decryption engine are unique and must match with each combination of encryption technology setting.

302

Compile and link source code with encryption enabled.

303

Code to instruct a zeroed non-encrypted database that is appended to the linker's *.exe file.
As the preamble executes initially, it must read its database determining what it may have to map around (i.e. the checksum logic) if stored in the database.

304

Linker now randomly places checksum within extremities of executable image, executionally mapping around it.

305

End

FIG. 3

| From CPU Class | To CPU Class | Protocol | | |
|---|---|---|---|---|
| 1 | 2 | Description | Command Index | Args |
| | | Serial #: | 1 - 0000000000000 | |
| | | Length of App Name: | 2 - 00 | |
| | | Product Name: | 3 - "Application Name" | |
| | | National ID(s): | 4 - 0000[,0000(Optional)] ( 2 Nations Max.) | |
| | | Version #: | 5 - 0000.00.00 | |
| | | Enable/Disable Key(1) | 6 - Preface e(or d) then Commands 1,2,3,5,4 | |

FIG. 5A

| From CPU Class | To CPU Class | Protocol |
|---|---|---|
| 1 | 3 | Download of Licensed Product Name.EXE and associated files.( Delete file list on invalid execution). |

Command   Args index

| Command | Args index |
|---|---|
| Add: Phone # | 1 - Phone # |
| Delete: Phone # | 2 - Phone # |
| Modify: Phone # | 3 - New Phone # |
| Time between Attorney Calls: | 4 - 00:00:00 |
| Add Attorney Fax Number: | 5 - Phone # |
| Delete Attorney Fax Number: | 6 - Phone # |
| Modify Attorney Fax Number: | 7 - New Phone # |
| Version #: | 8 - 0000.00.00 |
| Serial Number #: | 9 - 000000000000 |
| Product Name: | 10 - "Application N" |
| Nation ID: | 11 - 1( USA) |
| Add National ID: | 12 - N( New National ID) |
| Delete National ID: | 13 - N( National ID to delete) |
| Modify National ID: | 14 - N( New National ID) |
| Add National Modem#: | 15 - Phone # |
| Delete National Modem#: | 16 - Phone # |
| Modify National Modem#: | 17 - New Phone # |

FIG. 5B

| From CPU Class | To CPU Class | Protocol | | |
|---|---|---|---|---|
| 2 | 2 | Description | Command Index | Args |
| 2 | 3 | Echo of: | 1 - xxxxxxxxxxnn | |
| | | Description | Command Index Rcvd | Response |
| | | Initialization | 1 | Hash table[00, 01, ... FF] Unique 256 bytes in random order |
| | | Standard command | 2 | xxxxxxxxxxnn where x's are phone number of computer running Algorithm And nn is hash table byte Corresponding to # of executions + 1 |
| | | | OR | |
| | | | | q - If algorithm should not be executed. |

FIG. 5C

| From CPU Class | To CPU Class | Protocol | | |
|---|---|---|---|---|
| 3 | 1 | Description | Command | Index |
| | | Error( Can not delete all National IDs) | | 1 |
| 3 | 2 | Description | Command | Index |
| | | Caller ID info: i | 1 - Initialization byte | |
| | | Caller ID info: xxxxxxxxxn | 2 - x(s) Phone number of computer running algorithm, n Number of Executions. | |
| 4 | 2 | Description | Command | Args Index |
| | | Disable Key(2) | 1 - d00000000000016ApplicationName0000.00.000000,[0000] Which is "d" Serial Number"App Name" Length of App Name Version # National ID(s)[without Spaces] OR 2 - da16ApplicationName0000,[0000] [without spaces] | |

FIG. 5D

| From CPU Class | To CPU Class | Protocol | | |
|---|---|---|---|---|
| 5 | 2 | Description | Command | Args |
| | | | Index | |
| | | Enable/Disable Key(2) | 1 - e(or d)0000 [Enable or Disable] Nation Software | |
| 6 | 2 | Description | Command | Args |
| | | | Index( in Foreign Language): | |
| | | Disable Key(2) | 1 - d00000000000016Application Name0000.00.000000,[0000] Which is "d" Serial Number"App Name" Length of App Name Version # National ID(s)[without Spaces] OR 2 - da16Application Name0000,[0000] [without spaces] | |
| 7 | 1 | Download of LINK.EXE, Command Processor.EXE, SLL.EXE | | |
| 8 | 10 | Download of LINK.EXE to Class 10 CPU | | |
| 9 | 10 | Download of Command Processor.EXE to Class 10 CPU | | |
| 10 | 7 | Creation of Software Licensing Logic, SLL.EXE Download of the LINK.EXE and Command Processor and SLL.EXE package. | | |
| 11 | 2 | Description | Command | Args |
| | | | Index | |
| | | Enable/Disable Key(1) | 1 - e(or d)0000 [Enable or Disable] Nation Software | |

FIG. 5E

SOFTWARE ALGORITHM SECURITY

CROSS REFERENCE

This application is a continuation-in-part and claims benefit of PCT Application No. PCT/US17/58051, filed Oct. 24, 2017, which claims benefit of U.S. Patent Application No. 62/412,167, filed Oct. 24, 2016, the specification of which is incorporated herein in its entirety by reference.

FIELD OF THE INVENTION

The present invention relates to a process in combination with licensed software that provides increased security and survivability to software executable algorithms that are operational, non-continuously running, requiring keyboard input and a connected modem.

BACKGROUND OF THE INVENTION

Until the present invention, herein also referred to as Software Algorithm Security ("SAS"), the industry's form of copy protection left software algorithm executables potentially vulnerable to hacking. SAS provides a safeguard to executables by designing a Software Licensing Logic ("SLL") to preamble compilational software algorithm executables for licensing purposes. Each executable licensed could be tracked and reported if executed illegally or hacked. Illegal execution would include not originating execution from a preset collective of land line phone numbers, or attempting to execute the executable image outside the confines of a national boundary. A hacker's progress can be continuously monitored and reported, culminating in self-destruction of the algorithm's executable image and, optionally, selected files specified during the licensing process. Three copies of the preamble executable image would be compared to minimize hacker opportunity while maximizing reliability of algorithm structure on disk or solid state memory. The technology is comprised of an executable preamble, which when encrypted, can only execute from a central processing unit ("CPU") Read Only Memory ("ROM"), possessing the appropriate, non-publicly exposed, decryption logic. For each algorithm licensed, the preamble invokes the licensed material by starting it as an executable image via an execution call. Only the encrypted preamble is passed to first the licensee of the software under development, then to the software development responsibility, and finally to the end user. Thus, the same preamble serves to query and collect information from each of the three aforementioned development categories. When finished collecting information from the end user, the preamble dumps the statistics from all three sources to the computer actually authorizing execution of the end user's licensed product. This computer queues up the data for transfer to a master database collection computer, substituting an end user algorithm index for the entire amount of data logged in the database.

Just as SAS was able to prevent a criminal's illegal end user execution, SLL incorporates additional necessary computers to disable/enable: judged criminal end user usage, terrorist end user usage by foreign government authority, and by highest priority, total end user usage within a foreign country for reason of national military authority. Because the effects of disabling a foreign nation's software can be reversed once peace has been achieved, SLL claims to be useful as a tool to resolve inter-nation conflicts peacefully. However, SLL can only disable software when it (re)starts. It has no effect on software, which once started, runs continuously. Lastly, as every algorithm is registered for execution within a particular national boundary, it leaves a footprint describing its origins, function, purchase price, etc. for public or private dissemination over an Internet website; thereby providing the public awareness aspect to the software licensed.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

SUMMARY OF THE INVENTION

The present invention features a system for preventing an unauthorized execution of a software algorithm by providing a preamble to the software algorithm. In some embodiments, the system comprises: a licensing software engine; a software licensee ("Class 7 CPU"), storing the licensing software engine; a software development CPU ("Class 1 CPU"); one or more end user computers (collectively referred to as a "Class 3 CPU"); and an executable image controller ("Class 2 CPU"). In an embodiment, the Class 3 CPU is configured to download and execute the software algorithm via one or more land line modems, each having a phone number. In another embodiment, the Class 2 CPU is configured to communicate with the Class 3 CPU via the one or more land line modems. In further embodiments, the Class 2 CPU stores a list of authorized phone numbers associated with a set of authorized end user computers.

Consistent with previous embodiments, the licensing software engine compiles the preamble, herein referred to as a preamble binary file. In some embodiments, the preamble binary file acquires and stores identifying information from the Class 7 CPU. The preamble binary file may then analyze said identifying information to determine if the Class 7 CPU is a proprietor of a software algorithm license associated with the software algorithm. If the Class 7 CPU is identified as such, then the preamble binary file may be stored by the Class 7 CPU until it is downloaded to the Class 1 CPU.

In other embodiments, an attempt to execute the software algorithm by the Class 3 CPU triggers the Class 1 CPU to download and transmit the preamble binary file to the Class 3 CPU via a wireless connection. In an embodiment, the preamble binary file captures each phone number of the Class 3 CPU via modem caller ID, and sends said phone numbers to the Class 2 CPU. In another embodiment, the Class 2 CPU signals the Class 1 CPU to download the software algorithm to each end user computer, of the Class 3 CPU, whose phone number is on the list of authorized phone numbers. The present system is thus able to prevent unauthorized access to, and consequently a hacking of, the software algorithm.

In additional embodiments, the phone number of each end user computer not on the list of authorized phone numbers is provided to appropriate authorities. Said appropriate authorities may be defined in the preamble binary file. Moreover, any attempt to execute the software algorithm exposes the phone number of the end user computer making said attempt to the Class 2 CPU. Therefore, the system is also able to trace an unauthorized attempt at executing the software algorithm to the end user computer making said attempt. In yet another embodiment, the software algorithm is disabled when an attempt to execute the software algorithm is determined to be unauthorized.

In supplementary embodiments, the preamble binary file stored on the Class 7 CPU is downloaded to one or more Class 1 CPUs, wherein each Class 1 CPU develops one or more software algorithms to be preambled by the system.

In further aspects, the Class 2 CPU is configured to acquire a set of data comprising end user statistics and passes the set of data to an interactive database stored on a data retrieval CPU ("Class 12 CPU").

In other embodiments, the licensing software engine comprises: a standalone encryption development station ("Class 8 CPU"), having a software encryption development library to uniquely develop encryption technologies to generate an encrypted preamble binary file; a standalone decryption development station ("Class 9 CPU"), having a software decryption library to uniquely develop decryption technologies to generate a decryption scheme for decrypting the encrypted preamble binary file; and a licensing system preamble executable CPU ("Class 10 CPU"), for storing, developing and maintaining a preamble binary source code from which the preamble binary file is developed.

In exemplary embodiments, the encrypted preamble binary file is transmitted between CPUs, as previously described, instead of the preamble binary file.

Currently, licensed software algorithm executables are vulnerable to unauthorized code modification and execution. Existing methods mitigate this vulnerability by employing a checksum created by XORing the bytes of the executable. However, this checksum is incapable of adequately preventing hacking and unauthorized execution of the executable. Tools such as DEBUG. EXE, etc. enable hacking by setting break points during code execution to identify the checksum location. Once the checksum location is identified, patches to the executable can be created to alter the intended logic flow of the executable. A register dump used at the location of the checksum enables use of the new checksum, thus completing unauthorized modification of the executable for permanent inappropriate re-execution. The present invention discloses a novel solution to this vulnerability by providing an encrypted preamble distinctive to the software algorithm executable. This preamble requires any CPU seeking to execute the software algorithm to gain authorization. In this way, the software algorithm is near-invulnerable to an unauthorized execution or modification of the code, Additionally, the system only allows the execution or downloading of the software algorithm via a land line modem. Therefore, the system is able to trace any computer, via a modem phone number, upon which a nefarious attempt at executing the software algorithm is made.

As used in the present application, terms like "engine", "controller", "station", and the like are intended to refer to a computer-related entity or an entity related to an operational machine with one or more specific functionalities. The entities disclosed herein can be either hardware, a combination of hardware and software, or software in execution. For example, an entity may be, but is not limited to being, a process running on a processor, a processor, an object, an executable, a thread of execution, a program, and/or a computer. By way of illustration, both an application running on a server and the server can be said entity. One or more entities may be localized on one computer and/or distributed between two or more computers. Also, these entities may execute from various computer-readable media having various data structures stored thereon.

As one skilled in the art will appreciate, any digital computer system can be configured or otherwise programmed to implement the methods and systems disclosed herein, and to the extent that a particular digital computer system is configured to implement the methods and systems of this invention, it is within the scope and spirit of the present invention. Once a digital computer system is programmed to perform particular functions pursuant to computer-executable instructions from program software that implements the present invention, it in effect becomes a special purpose computer particular to the present invention.

Computer executable instructions implementing the methods and systems of the present invention can be distributed to users on a computer-readable medium and are often copied onto a hard disk or other storage medium. When such a program of instructions is to be executed, it is usually loaded into the random access memory of the computer, thereby configuring the computer to act in accordance with the techniques disclosed herein. All of these operations are well known to those skilled in the art and thus are not further described herein.

As used herein, the term "computer-readable medium" encompasses distribution media, intermediate storage media, execution memory of a computer, and any other medium or device capable of storing for later reading by a computer or a computer program implementing the present invention.

As used herein, the term "software algorithm" refers to a software algorithm executable, a software code, a software program, or any set of instructions executable by a digital computer.

As used herein, the term "preamble" constitutes software logic, created by the system of the present invention, to preface a software algorithm executable for (i) collecting, analyzing, storing and confirming information identifying the CPU upon which the executable is run and (ii) collecting and storing data pertaining to the software algorithm executable being prefaced. This is distinctive from the preamble employed in computer networks, which is used to indicate the start of a data transmission for the purpose of synchronizing the timing of transmission between two computers.

BRIEF DESCRIPTION OF THE DRAWINGS

FIG. 2 is a flowchart depicting an embodiment of the path the preamble may take as it is passed to the plurality of CPUs comprising the present system.

FIG. 3 is a flowchart depicting the encryption engine process. It shows the linker logic modifications for logic within the Class 8 CPU downloaded to the Class 10 CPU.

FIGS. 5A-5E show exemplary models of inter-CPU correspondence protocols of the present invention.

DESCRIPTION OF PREFERRED EMBODIMENTS

Figure 1A:
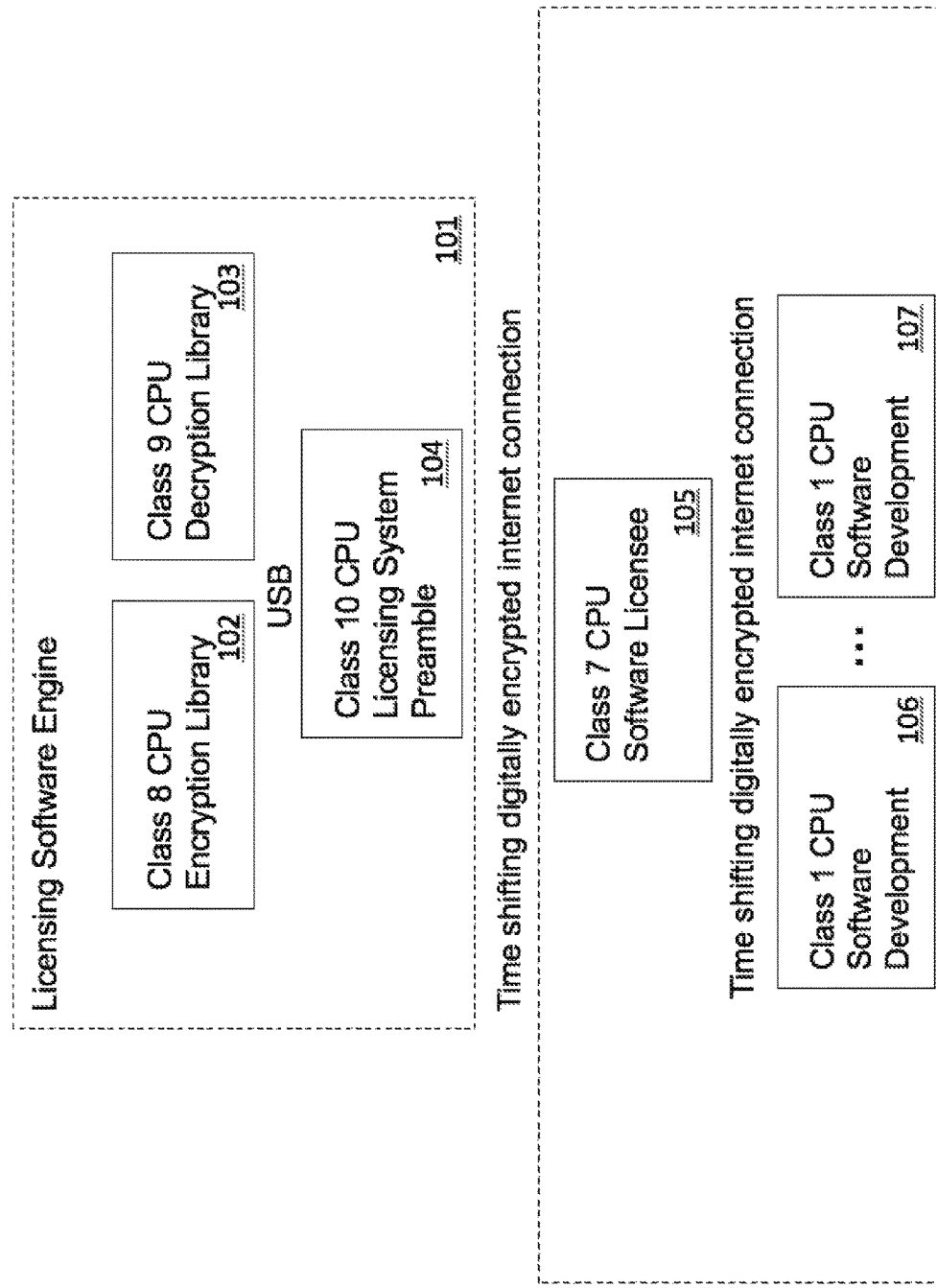
FIGS. 1A-1B shows a system block diagram for SAS system with optional Class 4, Class 5, Class 6 and Class 11 law enforcement CPUs; the block diagram also depicts an embodiment of the system having a plurality of Class 3 CPUs, a plurality of Class 1 CPUs, a primary and a backup Class 2 CPU and a primary and backup Class 12 CPU.
Figure 1B:
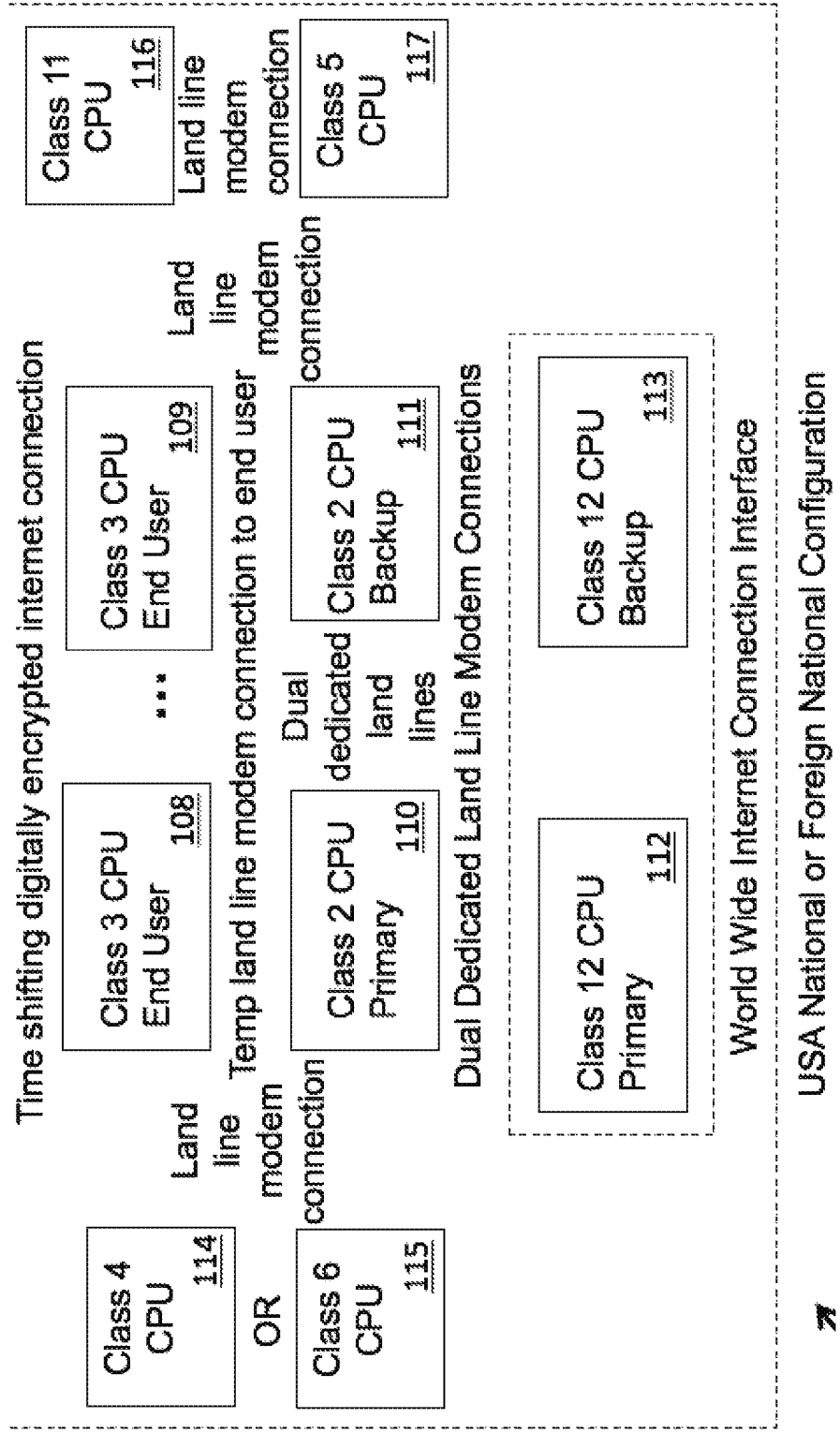

Referring now to FIGS. 1-5D, the present invention features a system (100) for preventing an unauthorized execution of a software algorithm by providing a preamble to the software algorithm. The present system (100), also referred to as Software Algorithm Security ("SAS"), employs the use of software licensing logic ("SLL") to preamble proprietary software. FIG. 1 shows an overall system block diagram illustrating CPU class interconnectivity of an embodiment of the SLL design. SLL capitalizes on the advantages of the internet, where use of the internet is most practical. For all other connectivity, SLL utilizes the interconnectivity of a national land line network for security and redundancy.

In some embodiments, the system (100) comprises: a licensing software engine (101); a software licensee ("Class 7 CPU") (105), storing the licensing software engine (101); a software development CPU ("Class 1 CPU") (106); one or more end user computers (collectively referred to as a "Class 3 CPU") (108); and an executable image controller ("Class 2 CPU") (110). In an embodiment, the Class 3 CPU (108) is configured to download and execute the software algorithm via one or more land line modems, each having a phone number. In another embodiment, the Class 2 CPU (110) is configured to communicate with the Class 3 CPU (108) via the one or more land line modems. In further embodiments, the Class 2 CPU (110) stores a list of authorized phone numbers associated with a set of authorized end user computers.

Consistent with previous embodiments, the licensing software engine (101) compiles the preamble, herein referred to as a preamble binary file (200). In some embodiments, the preamble binary file (200) acquires and stores identifying information from the Class 7 CPU (105). The preamble binary file may then analyze said identifying information to determine if the Class 7 CPU (105) is a proprietor of a software algorithm license associated with the software algorithm. If the Class 7 CPU (105) is identified as such, then the preamble binary file (200) may be stored by the Class 7 CPU until it is downloaded to the Class 1 CPU.

In other embodiments, an attempt to execute the software algorithm by the Class 3 CPU (108) triggers the Class 1 CPU (106) to download and transmit the preamble binary file (200) to the Class 3 CPU (108) via a wireless connection. In an embodiment, the preamble binary file (200) captures each phone number of the Class 3 CPU (108) via modem caller ID, and sends said phone numbers to the Class 2 CPU (110). In another embodiment, the Class 2 CPU (110) signals the Class 1 CPU (106) to download the software algorithm to each end user computer, of the Class 3 CPU (108); whose phone number is on the list of authorized phone numbers. The present system is thus able to prevent unauthorized access to, and consequently a hacking of, the software algorithm. In additional embodiments, the phone number of each end user computer not on the list of authorized phone numbers is provided to appropriate authorities. Said appropriate authorities may be defined in the preamble binary file (200). Moreover, any attempt to execute the software algorithm exposes the phone number of the end user computer making said attempt to the Class 2 CPU (110). Therefore, the system is also able to trace an unauthorized attempt at executing the software algorithm to the end user computer making said attempt. In yet another embodiment, the software algorithm is disabled when an attempt to execute the software algorithm is determined to be unauthorized.

In supplementary embodiments; the preamble binary file (200) stored on the Class 7 CPU is downloaded to one or more Class 1 CPUs, wherein each Class 1 CPU develops one or more software algorithms to be preambled by the system.

In some embodiments, the Class 2 CPU is further configured to acquire a set of data comprising end user statistics and passes the set of data to an interactive database stored on a data retrieval CPU, herein referred to as a Class 12 CPU (112).

In other embodiments, the licensing software engine (101) comprises: a standalone encryption development station ("Class 8 CPU") (102), having a software encryption development library to uniquely develop encryption technologies to generate an encrypted preamble binary file; a standalone decryption development station ("Class 9 CPU") (103), having a software decryption library to uniquely develop decryption technologies to generate a decryption scheme for decrypting the encrypted preamble binary file; and a licensing system preamble executable CPU ("Class 10 CPU") (104); for storing, developing and maintaining a preamble binary source code from which the preamble binary file (200) is developed.

In exemplary embodiments; the encrypted preamble binary file is transmitted between CPUs, as previously described, instead of the preamble binary file (200).

The present invention further features a method for preventing an unauthorized execution of a software algorithm by providing a preamble to said software algorithm. In some embodiments; the present method comprises providing a software licensing system having a licensing software engine (101); a Class 7 CPU (105), storing the licensing software engine (101); a Class 1 CPU (106); a Class 3 CPU (108); and a Class 2 CPU (110). In an embodiment, the Class 3 CPU (108) is configured to download and execute the software algorithm via one or more land line modems, each having a phone number. In another embodiment, the Class 2 CPU (110) is configured to communicate with the Class 3 CPU (108) via the one or more land line modems. In further embodiments, the Class 2 CPU (110) stores a list of authorized phone numbers associated with a set of authorized end user computers.

The present method may further comprise compiling and transmitting the preamble binary file (200), via the licensing software engine (101), to the Class 7 CPU (105). The preamble binary file (200) may then acquire and analyze identifying information from the Class 7 CPU (105), and use said identifying information to determine if the Class 7 CPU (105) is a proprietor of a software algorithm license associated with the software algorithm. If the Class 7 CPU (105) is determined to be the proprietor, then the preamble binary file (200) is stored by the Class 7 CPU (105) until downloaded by the Class 1 CPU (106).

In additional embodiments, the Class 1 CPU (106) is triggered to download the preamble binary file (200) from the Class 7 CPU (105) when the Class 3 CPU (108) attempts to execute the software algorithm. The preamble binary file (200) may then be transmitted from the Class 1 CPU (106) to the Class 3 CPU (108), via a wireless connection. In exemplary embodiments, the preamble binary file (200) captures each phone number of the Class 3 CPU (108), via modem caller ID, and transmits said phone numbers to the Class 2 CPU (110). In an embodiment, the Class 2 CPU (110) signals the Class 1 CPU (106) to download the software algorithm to each end user computer, of the Class 3 CPU (108), whose phone number is on the list of authorized phone numbers.

The present system is thus able to prevent unauthorized access to, and consequently a hacking of, the software algorithm. In additional embodiments, the phone number of each end user computer not on the list of authorized phone numbers is provided to appropriate authorities. Said appropriate authorities may be defined in the preamble binary file (200). Moreover, any attempt to execute the software algorithm exposes the phone number of the end user computer making said attempt to the Class 2 CPU (110). Therefore, the system is also able to trace an unauthorized attempt at executing the software algorithm to the end user computer making said attempt. In yet another embodiment, the software algorithm is disabled when an attempt to execute the software algorithm is determined to be unauthorized.

In supplementary embodiments, the preamble binary file (200) stored on the Class 7 CPU (105) is downloaded to one or more Class 1 CPUs, wherein each Class 1 CPU develops one or more software algorithms to be preambled by the system.

In some embodiments, the Class 2 CPU (110) is further configured to acquire a set of data comprising end user statistics and passes the set of data to an interactive database stored on a Class 12 CPU (112).

In other embodiments, the licensing software engine (101) comprises:
  a Class 8 CPU (102), having a software encryption development library to uniquely develop encryption technologies to generate an encrypted preamble binary file;
  a Class 9 CPU (103), having a software decryption library to uniquely develop decryption technologies to generate a decryption scheme for decrypting the encrypted preamble binary file; and
  a Class 10 CPU (104), for storing, developing and maintaining a preamble binary source code from which the preamble binary file (200) is developed.

In exemplary embodiments, the encrypted preamble binary file is transmitted between CPUs, as previously described, instead of the preamble binary file (200).

The present invention further features a system for preventing an unauthorized execution of a software algorithm. In some embodiments, the system comprises: one or more end user computers; one or more landline modems, each having a phone number, configured to download the software algorithm to the one or more end user computers; a first processor; and a first memory coupled to the first processor. In other embodiments, the first memory stores computer-executable instructions that, when executed by the first processor, causes the first processor to:
  develop a preamble binary file for the software algorithm;
  transmit the preamble binary file to the one or more end user computers, via a wireless connection, at an attempt to execute the software algorithm by the one or more end user computers;
  capture each phone number, via the preamble binary file, by accessing the modem caller ID;
  receive a signal identifying one or more authorized end user computers, of the one or more end user computers; and
  transmit the software algorithm to the one or more authorized end user computers.

The system may further comprise a second processor and a second memory coupled to the second processor. In an embodiment, the second memory stores a list of authorized phone numbers associated with a set of authorized end user computers. In another embodiment, the second memory stores computer-executable instructions that, when executed by the second processor, causes the second processor to:
  acquire each phone number captured by the first processor;
  identify the one or more authorized end user computers based on the list of authorized phone numbers; and
  signal the first processor to transmit the software algorithm to the one or more authorized end user computers.

The system is thus able to prevent unauthorized access to, and thus a hacking of, the software algorithm. In exemplary embodiments, the first memory further stores a preamble binary source code from which the preamble binary file is generated.

System Details

The standalone development stations (i.e., the Class 8 and 9 CPUs) may process the encryption and decryption logic used on the licensing system preamble executable software and intercommunication paths. The decryption logic may be housed in the microprocessor Read Only Memory ("uP ROM") pre-processor. The encryption technology used must be hack-resistant and applied to the licensing system preamble binary image. In an embodiment, the preamble binary source code is stored, developed, and maintained on the Class 10 CPU (104). Once compiled into a binary file, the preamble binary source code may be encrypted for passage to a chain of different CPU classes. In another embodiment, the main product of the licensing software engine (101) is the preamble binary file, including its encryption and decryption. Therefore, the passing of the licensing software engine (101) and the passing of the preamble binary file are herein synonymous events.

In a further embodiment, a software licensee, herein interchangeably referred to as a Class 7 CPU (105), acts as a website host CPU. The preamble binary file may (optionally) be transferred to a dedicated Class 10A CPU from the Class 10 CPU (104) for automatic download to the Class 7 CPU (105). In some embodiments, a Class 1 CPU (106) is the software developer CPU configured to download the licensing software engine (101) from the Class 7 CPU (105). In other embodiments, a Class 3 CPU (108), or end user computer, is reserved for executing the proprietary software algorithm via a land line modem. Both the Class 1 CPU (106) and Class 3 CPU (108) may receive the preamble binary file. As the preamble binary file is passed to these CPU classes, in preferred embodiments, it acquires the information to license and permit execution of the proprietary software algorithm on the Class 3 CPU (108).

Figure 4:
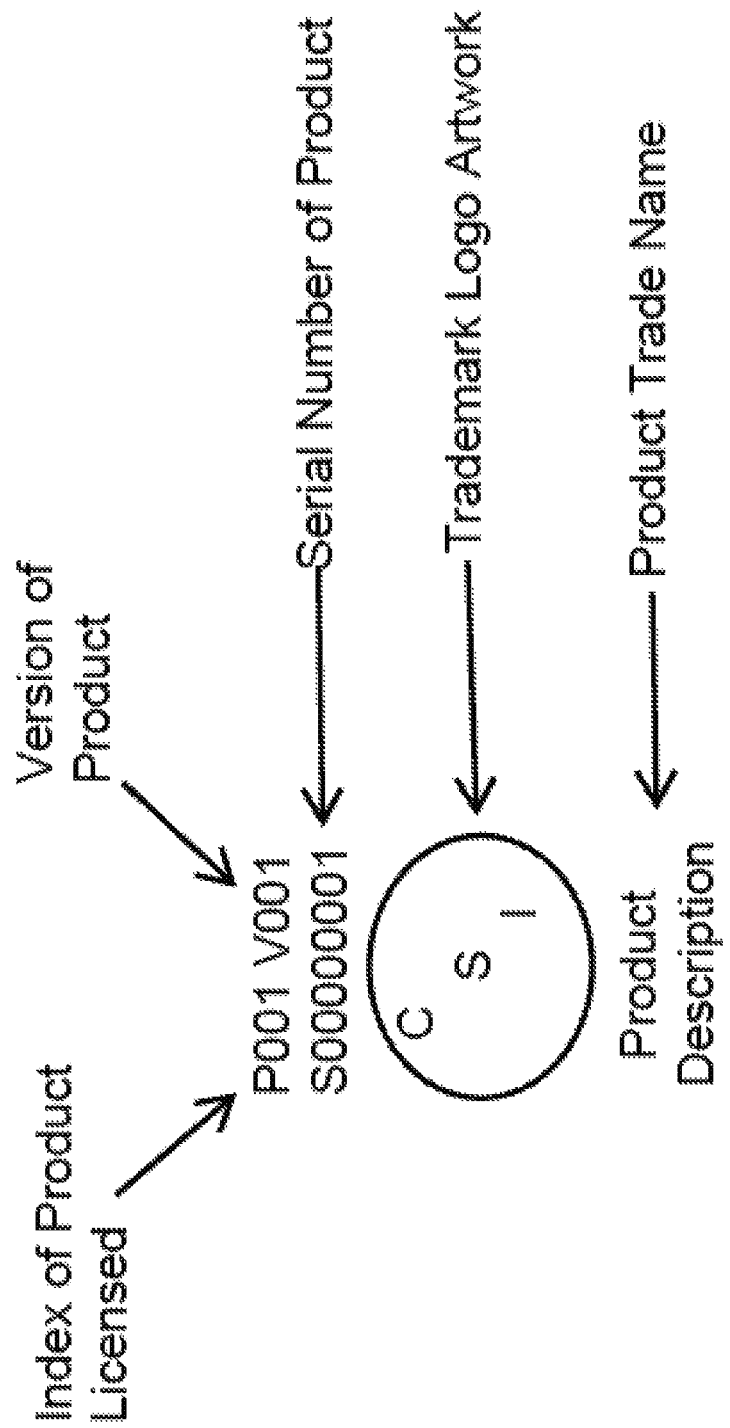
FIG. 4 is a sample format for the desktop icon.

When downloaded, the preamble may initially be selected from the desktop as the icon "P001 V001/S00000001/SLL Artwork/"Let's Get Started" (FIG. 4). Once the preamble binary file is passed to the Class 7 CPU (105), the preamble binary file may acquire the authorized assignee, or more practically the software licensee's, information. In an embodiment, this information identifies the owner of the software license. Non-limiting examples of the owner include, but are not limited to: governmental entities, educational entities, commercial entities, organizational entities, etc. The information gathered at this opportunity may identify the party responsible for financing the development of the software. It is at this level that the list of accessible Class 3 CPU (108) land line phone numbers, as defined by the Class 1 CPU (106), may be controlled. The Class 1 CPU (106) may be restricted, for copy protection purposes, to performing software development on the list of land line connections provided by the Class 7 CPU (105). Likewise, the Class 3 CPU (108), or end user computer, may also be restricted to utilizing only certain land lines for running the product through. During this process, the preamble binary file may name itself (e.g., a name on of an icon stored on a user's desktop) in a determined format. An example may be "P001"/Licensee's artwork icon/"Licensee", where "Licensee" is the name of the entity licensing the product. In other embodiments, the preamble binary file collects information that points to whether or not the proprietary software algorithm is to be given public or private exposure.

Once the patent protection, financing, software project description, and desktop artwork is complete, a head software developer may be notified to begin work on a Class 1 CPU (106). At first opportunity, the developer may download the "Licensee".bin preamble binary file image. In an embodiment, when this file is first run on the Class 1 CPU (106), it will request program development information. Non-limiting examples of said information includes, but is not limited to: a functional description of the software being developed, and/or the program name being assigned to the software for public or private identification purposes. In some embodiments, the preamble binary file changes its representation to P001 V001/Licensee's artwork/"Program Description" on the desktop (where P001 V001 stands for Product 1, version 1) on the Class 1 CPU (106), which configures itself to decrypt then invoke "Program Name"001.exe once passed to the Class 3 CPU (108). To create a new version, the developer may select the desktop icon P001 V001/Licensee's artwork/"Program Description", which runs "Program Name".bin. Once a version of the proprietary software algorithm executable is available, the Class 3 CPU (108) may download the particular version needed along with "Program Name".bin. In exemplary embodiments, for each "Program Name".bin, the preamble binary file keeps track of incrementing the serial numbers for each copy of the proprietary software algorithm downloaded (as well as what user downloaded which version), so updates can be recommended to the Class 3 CPU (108). Moreover, the Class 1 CPU (106) may be given the opportunity to define the length of time a software license extends and the maximum number of executions possible for each serial numbered release of the proprietary software algorithm. Statistics on the time between attorney contacts, in the event the software is stolen and needs recovery, may be defined when the preamble binary file is in development mode as well.

Consistent with previous embodiments, the Class 3 CPU (108) is reserved for an end user to run the proprietary software algorithm, or application program. Non-limiting examples of information kept for end user statistics may include, but is not limited to: number of executions made, the number of unique land line phone numbers the application program is permitted to run from, the national land line(s) used to determine whether execution of the application program is enabled or disabled, the number of busy/unreachable results while attempting to tie in through the national modem, etc. In some embodiments, the Class 3 CPU (108) interfaces over modem with a Class 2 CPU (110) whenever "Program Name".bin is invoked (by desktop icon P001 V001/S00000001/Licensee's artwork/"program Description" selection via mouse, keyboard, touch screen, voice, etc.). In other embodiments, the Class 2 CPU (110) is an executable image controller serving to allow or disallow execution of the proprietary software algorithm on the Class 3 CPU (108) by echoing a phone number associated with the land line modem of the Class 3 CPU (108) to permit the CPU to ensure the phone number is within an authorized list. The phone number used to communicate with the Class 2 CPU (110) is forced to be made available via caller ID information of the Class 3 CPU (108). In exemplary embodiments, the Class 2 CPU (110) echoes back the number it received in encrypted form. The received number once decrypted must match one of the numbers in the list of allowed phone numbers. If not, execution of the proprietary software algorithm is denied. In additional embodiments, if legal authorization has been specified by the Class 7 CPU (105), a lawyer is contacted to pursue recovery of the illegally executed proprietary software algorithm. All of this may be done automatically. Further, by making the phone number used to access the national modem toll free and accessible from within the 50 states only, the call itself proves it must have occurred within the national boundary. In preferred embodiments, should the call occur outside the national boundary, it will not be answerable by either the primary or backup modem. In this event execution of the software algorithm may be automatically denied.

A circumstance may arise in which a known criminal passes all criteria to execute the proprietary software algorithm. In accordance with the proper channels of law enforcement, other CPU classes may be used by law enforcement to override the ability to execute the application program to the known criminal party, as will be subsequently discussed.

In supplementary embodiments, a Class 12 CPU (112) serves as a data retrieval computer determining statistics on the proprietary software algorithm in real time. The Class 12 CPU may provide a database interface to an internet for public or private exposure of the proprietary software algorithm as dictated by the Class CPU 7 (105). From the database being accessed, one may determine licensee, development, or end user statistics.

Consistent with previous embodiments, when a Class 7 CPU (105) requires security of a proprietary software algorithm under development, the system utilizes SLL to preamble the proprietary software algorithm. In some embodiments, the first step in providing a preamble to the proprietary software algorithm is passing the licensing software engine (101) to the Class 7 CPU (105). In other embodiments, information identifying the Class 7 CPU (105) as owner of a proprietary software algorithm license is required once the licensing software engine (101) is passed. In further embodiments, once the licensing software engine (101) is passed to the Class 7 CPU (105), the second step comprises downloading an encrypted version of the licensing software engine (101) from the Class 7 CPU (105) to the Class 1 CPU (106). The Class 1 CPU (106) may then develop a *.exe file containing the proprietary software algorithm. A preamble binary source code may then be stored, maintained, and developed by the Class 10 CPU (104). In additional embodiments, when the Class 3 CPU (108) attempts to execute the proprietary software algorithm, the Class 1 CPU (106) sends the preamble binary file to the Class 3 CPU (108) and a land line modem phone number associated with the Class 3 CPU (108) is received by the Class 2 CPU (110) via modem caller ID. In preferred embodiments, the Class 2 CPU (110) then authorizes use of the proprietary software algorithm for the Class 3 CPU (108), if the land line modem phone number matches a land line phone number on a list of phone numbers stored by the Class 2 CPU (110).

In an embodiment, the Class 1 CPU (106) and the Class 3 CPU (108) each comprise a plurality of CPUs. The Class 7 CPU (105) may be a patent developer or business owner. Further, the Class 2 CPU (110) may comprise an executable image controller primary and an executable image controller backup while the Class 12 CPU (112) may comprise a licensing database retrieval primary CPU and a licensing database retrieval backup CPU.

In another embodiment, a Class 4 (114) CPU, serving as a USA law enforcement software executable controller, has the ability to enable or disable execution of the proprietary software algorithm in the event of it being criminally used. The Class 4 CPU (114) may communicate with the Class 2 CPU (110) whether the proprietary software algorithm is executable based on judicial decision. In some embodiments, the Class 2 CPU (110) acts as an software algorithm execution decision-maker based on stored input from law enforcement. It may queue, then transfer the bulk of data accumulated concerning the proprietary software algorithm's executable image to the Class 12 CPU (112) at first opportunity. For each copy of the proprietary software algorithm's image, the Class 2 CPU (110) may create a unique algorithm index.

In some embodiments, a Class 5 CPU (117) serves as a USA Military CPU defining logic to automatically or manually enable or disable execution of any proprietary software algorithm executable for any foreign national security concerns. The Class 5 CPU (117) may communicate with the Class 2 CPU (110) to define circumstances under which the proprietary software algorithm may run, where disabling of the software algorithm is enforced at top priority. The Class 5 CPU (117) may support basic handshake of Nation Identification ("ID") and enabling/disabling operate at top priority. This CPU may serve as its own software development station at medium priority.

In other embodiments, an Executive Order Interface may serve as a Class 11 CPU (116). The sitting U.S. President or Presidential staff may request the foreign nation to have all its software disabled, with subsequent concurrence by the US military from the Class 5 CPU (117). The Class 11 CPU (116) may serve as its own development station at medium priority. It may serve to request to enable/disable foreign software at high priority by transmitting a National ID and enable/disable signal to a Class 5 CPU (117). The operator interface for the Class 11 CPU (116) may consist of a touch panel, flat spread map of the world with the ability to highlight the enable/disable status of countries with enough zoom to easily access the smallest country. Textual addressing through a pop-up keypad may also be available.

In further embodiments, a Class 6 CPU (115) is a Foreign Government software execution controlling CPU. The Class 6 CPU (115) may define logic to automatically or manually disable execution of the proprietary software algorithm executable (within the foreign nation) for foreign national security concerns. This CPU may communicate with the foreign national Class 2 CPU (110) to define which software can run and which cannot, Disabling of the proprietary software algorithm may be of a lower priority than for the Class 5 CPU (117). In an embodiment, the Class 6 CPU (115) is useful for curbing terrorist activity within foreign interest. It may serve as its own software development station at medium priority. In another embodiment, the Class 6 CPU (115) would allow known terrorists' software use to be disabled.

The Class 4 CPU (114), Class 5 CPU (117), Class 6 CPU (115) and Class 11 CPU (116) are all similar in that they serve a branch of authorized law enforcement having the ability to enable/disable execution of the of proprietary software algorithm (provided authorized channels in each case are followed). The coverage range between the Class 4 CPU (114) and Class 6 CPU (115) are non-overlapping. Class 4 CPU (114) may cover the national interior law enforcement, while the Class 6 CPU (115) may cover foreign national law enforcement, and may be unique within each foreign national boundary. The Class 5 CPU (117) and Class 11 CPU (116) may cover executive authority against hostile foreign powers. These may be given the highest priority of disabling application usage.

The preamble source and unencrypted binary must be safeguarded private to the Class 10 CPU. If the encrypted preamble cannot be bound to the software developer's executable, then the preamble source must be compiled with the software developer's source. If the preamble should not be released to the developer, then the developer must be willing to supply its source to the licensing authority, trusting the licensee to not alter the software supplied; and ensure that it is deleted once the preamble/developer's software is compiled together as one *.exe file. Then, the *.exe file may be passed for distribution to the end user, Distribution is far simpler if the preamble can be packaged as an encrypted file that may be positioned in front of the software developer's *.exe file.

There is some concern binding the preamble with the software developer's main program logic for startup on its potential of multi-process execution. This approach works provided the code generated by the "end main" statement can be edited out in the preamble and prior to the "end main." All register values necessary must be defined to drop into and execute the software developer's code (though this may not be necessary). The stacked pointer for return to the OS upon routine termination may now be used when the "end main" of the software developer's code is encountered. The software developer's code may have to begin on an even full length word address in absolute memory. If the code does have to begin on an such an address, then enough no-operations ("NOPs") must be appended to the end of the preamble so that the developer's software will begin executing on an even full word absolute address. If a 64 bit architecture was assumed and the preamble were 121 bytes long, 7 NOPs would be required. By placing the 7 NOPs after the end of preamble.exe then encrypting the *.exe file, the *.exe file is ready for transmission to the Class 7 CPU. Processing on the Class 7 CPU involves coding/debugging of the developer's software, Once the software developer's *.exe is ready for release, the encrypted developer's.exe (with header deleted) may be copied to preamble.exe and a final combined encrypted file is obtained in preamble.exe. This may be renamed to the developer's *.exe for passage to the Class 1 CPU.

Additional CPU Class Details

Class 1 CPU—a software development CPU, uses the downloadable licensing engine (from the Class 7 CPU) to license develop *.exe files. The downloadable licensing software engine comes as a binary file, optionally encrypted. As the binary file runs, it first asks for the name/stats of the licensee. If the licensee passes all requirements to license the software undergoing development, the "Licensee".bin binary file initially serves as a preamble to license the proprietary software algorithm executable undergoing development, beginning with serial number 1. Only when serial number 1 is handled, is the binary file created to license the proprietary software algorithm development file by future serial numbers. The preamble binary file accomplishes its role through repeated re-execution of preamble flow which eventually calls the software algorithm under development on a Class 3 CPU. The licensing software engine should be applied to every proprietary software algorithm under development on the software developer's computer, regardless of whether it's a multi-user main frame or a multi-program developing PC. A multi-user main frame will require a cross-assembler to replace the x(86) instruction set with the main frames equivalent. On every execution of the licensing software engine, a preamble binary file to the specific proprietary software algorithm under development is also created. The name/stats of the software algorithm being developed is acquired, and the preamble binary file specific to that software algorithm is named "Program Name".bin. This preamble binary file is then downloaded to the Class 3 CPU for attachment to preface the specific Class 3 CPU's software algorithm to either run or not run via Class 2 CPU handshaking.

There may exist 100,000+ Class 1 CPUs within the US alone. The Class 1 CPU provides (re)download of *.exe files to the Class 3 CPU only when parameters to the preamble binary file logic change, (e.g. a new authorized phone number added for use, etc.). The Class 1 CPU is redundant only if the Class 1 CPU itself requires redundancy (normally not redundant) with software backups taken for separated storage.

A software developer and operating system designer may both benefit from SAS being applied to the operating system on a permanently dedicated modem land line. A software developer is typically tied to editor/compiler applications continuously. This can permit application algorithms to start up immediately without the modem re-hookup delay. However, it may quickly exhaust the number of toll free lines available and unnecessarily drive up the manufacturing of receiving modems. Hence, the best government strategy is to use SAS on operating start up over a temporary modem hookup basis. This can protect the operating system from its competition, which for government is all embargo restricted foreign countries. Since the embargo restrictions can change, depending on foreign politic, the best case defensive strategy is to deny use of the operating system externally. By encrypting the SAS modem line phone number within the enormous data accompanying the operating system, prior to use, the technology should remain unhackable, Assuming SAS is positioned in this way, the Class 7 CPU, used for software development, could come protected.

Class 2 CPU—an executable image controller containing caller ID modems. This CPU receives statistics on every licensed *.exe from the Class 3 CPU. It stores these stats into an interactive database contained in the Class 12 CPU. The Class 2 CPU generates an Algorithm Index for every proprietary software algorithm handled and serves to allow/disallow execution of *.exe files the Class 3 CPU, It needs to be placed in unmanned, physically separated by 100 mi.+ for redundancy in every nation. The Class 2 CPU receives and passes through all stats on each Class 3 CPU to the Class 12 CPU. It retains, for efficiency in storage and execution time, only the Algorithm Index, Nation ID, enable/disable flags and reason for disable for every algorithm ever registered. The Class 2 CPU receives its executable over land line modem connection from a Class 12 CPU development station. Executable is received and stored at low priority. All responses to the Class 3 CPU occur at a high priority.

Class 3 CPU—an end user CPU. The Class 3 CPU must contain a modem for IP identification. It displays a value of return should the Class 3 CPU abuse execution of any licensed software algorithm. The associated land line caller ID information is transmitted to the Class 2 CPU as well as statistics contained in its database describing the executable being run. The Class 3 CPU receives authority to execute the proprietary software algorithm from the Class 2 CPU. It transmits statistics on each *.exe being licensed to the Class 2 CPU (via a self-contained database written to each software algorithm executable). The Class 3 CPU provides ability to execute from additional locations, number of executions, etc. and passes ability to define additional phone numbers for use when executing software, There may exist 100 Million+ Class 3 CPUs within the US.

Class 7 CPU—has ownership requirements to receive the SLL logic executable. The design will also accept generic software development via any type of authorized legitimate business ownership, reminding that ownership to patent their work as soon as possible. Other examples of why the SLL is so important to national security is, once implemented, it would force enemy agents to access US software from within US boundary. It would also add copy protection to the software industry preventing foreign smuggling of software at US street value and directly benefiting their economy. The Class 7 CPU serves to download the software licensing engine at high priority. This class CPU also queries information unique to ownership and/or management, such as the addition of other authorized phone numbers to execute the end user software from.

Class 8 CPU—a software encryption library development CPU to uniquely develop the encryption technologies used by the encryption engine and communication transmissions, once modified and compiled, Encrypt.exe is used to optimally encrypt the SLL executable and Class 3 CPU logic. Class 8 CPU and Class 9 CPU logic must perpetually remain separated while working together in indexed pairs. Encryption/Decryption is used exclusively for the export license on the proprietary software algorithm, or internally as another signature to insure national boundary use only. For national licensing, the heuristic art must be preserved normally, unless the software algorithm is being created to only execute within national boundaries. The Class 8 CPU serves to maintain and mature the encryption library at high priority. Throughput of the "encryption".lib is conducted over USB (Universal Serial Bus) at low priority. A separate encryption technology should be used for each nation, Encryption can only be applied to the Class 10 CPU logic and not Class 1 or Class 3 CPU logic.

Class 9 CPU—a software development CPU to uniquely develop the decryption logic library used by the decryption engine stored in uP ROM (microprocessor read only memory) pre-processor. Once modified and compiled, the logic to decrypt (provided it consists of a set of pure machine instructions and/or relationship to reserved register content) is downloaded to ROM memory to handle specially undefined instructions. Class 8 CPU logic and Class 9 CPU logic must perpetually remain separated. The Class 9 CPU decryption logic is developed and downloaded to a uP (microprocessor) chip manufacturer at high priority.

Class 10 CPU—contains the original software to preamble both the Class 1 CPU and Class 3 CPU. The software licensing logic is converted to an executable and downloaded to the Class 7 CPU. The Class 10 CPU develops and maintains the SAS logic at high priority. It downloads the finished current version of the logic to the Class 7 CPU at medium priority.

Class 10A CPU—an optional CPU. The Class 10A CPU is a website host configured to download the encrypted licensing software engine to the Class 7 CPU. It downloads the encryption engine (stored in the Encryption.lib file, encrypted) and contains the SAS logic for use by the Class 1 CPU, the Class 3 CPU, and the Class 7 CPU.

Moreover, it is to be noted that the processor that executes software that is national boundary restricted, is also national boundary restricted (because it is not wise for it to contain all nations decryption schemes). For private industry purposes, the same advantages would exist for the processors that exist for national boundary regulated software.

As used herein, the term "about" refers to plus or minus 10% of the referenced number, Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims, Therefore, the scope of the invention is only to be limited by the following claims. Reference numbers recited in the claims are exemplary and solely for ease of examination of this patent application by the patent office, and are not intended in any way to limit the scope of the claims to the particular features having the corresponding reference numbers in the drawings. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting of", and as such the written description requirement for claiming one or more embodiments of the present invention using the phrase "consisting of" is met.

What is claimed is:

1. A system for preventing an unauthorized execution of a software algorithm by providing a preamble to the software algorithm, the system comprising:
   (a) a licensing software engine (101);
   (b) a software licensee, herein referred to as a Class 7 central processing unit ("CPU") (105);
   (c) a software development CPU, herein referred to as a Class 1 CPU (106);
   (d) one or more end user computers, herein referred to collectively as a Class 3 CPU (108);
   (e) one or more land line modems, each having a phone number, configured to download the software algorithm to the one or more end user computers of the Class 3 CPU (108); and
   (f) an executable image controller, herein referred to as a Class 2 CPU (110), configured to communicate with the Class 3 CPU (108) via the one or more land line modems, wherein the Class 2 CPU (110) stores a list of authorized phone numbers associated with a set of authorized end user computers, wherein the licensing software engine (101) compiles the preamble, herein referred to as a preamble binary file (200), wherein the preamble binary file (200) is transmitted to the Class 7 CPU (105), wherein the preamble binary file (200) acquires and stores identifying information from the Class 7 CPU (105), wherein the preamble binary file (200) analyzes said identifying information to determine if the Class 7 CPU (105) is a proprietor of a software algorithm license associated with the software algorithm, wherein if the Class 7 CPU (105) is identified as such, the Class 7 CPU (105) stores the preamble binary file (200) until it is downloaded to the Class 1 CPU (106), wherein an attempt to execute the software algorithm by the Class 3 CPU (108) triggers the Class 1 CPU (106) to download and transmit the preamble binary file (200) to the Class 3 CPU (108) via a wireless connection, wherein the preamble binary file (200) captures each phone number of the Class 3 CPU (108) via modem caller ID, and sends said phone numbers to the Class 2 CPU (110), wherein the Class 2 CPU (110) signals the Class 1 CPU (106) to download the software algorithm to each end user computer, of the Class 3 CPU (108), whose phone number is on the list of authorized phone numbers, wherein the system is therefore able to prevent unauthorized access to, and thus a hacking of, the software algorithm, wherein the phone number of each end user computer not on the list of authorized phone numbers is provided to appropriate authorities, as determined by the preamble binary file (200), wherein any attempt to execute the software algorithm exposes the phone number of the end user computer making said attempt to the Class 2 CPU (110), thus the system is moreover able to trace an unauthorized attempt at executing the software algorithm to the end user computer making said attempt.

2. The system of claim 1, wherein the preamble binary file (200) stored on the Class 7 CPU (105) is downloaded to one or more Class 1 CPUs (106), wherein each Class 1 CPU (106) develops one or more software algorithms to be preambled by the system.

3. The system of claim 1, wherein the software algorithm is disabled when an attempt to execute the software algorithm is determined to be unauthorized.

4. The system of claim 1, wherein the Class 2 CPU (110) is further configured to acquire a set of data comprising end user statistics and passes the set of data to an interactive database stored on a data retrieval CPU, herein referred to as a Class 12 CPU (112).

5. The system of claim 1, wherein the licensing software engine (101) comprises:
   (a) a standalone encryption development station, herein referred to as a Class 8 CPU (102), having a software encryption development library to uniquely develop encryption technologies to generate an encrypted preamble binary file;
   (b) a standalone decryption development station, herein referred to as a Class 9 CPU (103), having a software decryption library to uniquely develop decryption technologies to generate a decryption scheme for decrypting the encrypted preamble binary file; and
   (c) a licensing system preamble executable CPU, herein referred to as a Class 10 CPU (104), for storing, developing and maintaining a preamble binary source code from which the preamble binary file (200) is developed.

6. The system of claim 5, wherein the encrypted preamble binary file is transmitted to appropriate CPUs instead of the preamble binary file (200).

7. A method for preventing an unauthorized execution of a software algorithm by providing a preamble to the software algorithm, comprising:
   a. providing a software licensing system comprising:
      i. a licensing software engine (101);
      ii. a software licensee, herein referred to as a Class 7 CPU (105), storing the licensing software engine (101);
      iii. a software development CPU, herein referred to as a Class 1 CPU (106);
      iv. one or more end user computers, herein referred to collectively as a Class 3 CPU (108),
      v. one or more land line modems, each having a phone number, configured to download the software algorithm to the one or more end user computers of the Class 3 CPU (108); and
      vi. an executable image controller, herein referred to as a Class 2 CPU (110), configured to communicate with the Class 3 CPU (108) via the one or more land line modems, wherein the Class 2 CPU (110) stores a list of authorized phone numbers associated with a set of authorized end user computers;

b. developing the preamble, herein referred to as a preamble binary file (200), via the licensing software engine (101);

c. transmitting the preamble binary file (200) from the licensing software engine (101) to the Class 7 CPU (105), wherein the preamble binary file (200) acquires and analyzes identifying information from the Class 7 CPU (105) to determine if the Class 7 CPU (105) is a proprietor of a software algorithm license associated with the software algorithm;

d. storing the preamble binary file (200) on the Class 7 CPU (105) if it is identified as the proprietor;

e. triggering the Class 1 CPU (106) to download the preamble binary file (200) from the Class 7 CPU (105) when the Class 3 CPU (108) attempts to execute the software algorithm;

f. transmitting the preamble binary file (200) from the Class 1 CPU (106) to the Class 3 CPU (108) via a wireless connection, wherein the preamble binary file (200) captures each phone number of the Class 3 CPU (108) via modem caller ID; and g. transmitting each phone number of the Class 3 CPU (108) to the Class 2 CPU (110), wherein the Class 2 CPU (110) signals the Class 1 CPU (106) to download the software algorithm to each end user computer, of the Class 3 CPU (108), whose phone number is on the list of authorized phone numbers, wherein the system is therefore able to prevent unauthorized access to, and thus a hacking of, the software algorithm, wherein the phone number of each end user computer not on the list of authorized phone numbers is provided to appropriate authorities, as determined by the preamble binary file (200), wherein any attempt to execute the software algorithm exposes the phone number, of the end user computer making said attempt, to the Class 2 CPU (110), thus the system is moreover able to trace an unauthorized attempt at executing the software algorithm to the end user computer making said attempt.

8. The method of claim 7, wherein the licensing software engine (101) comprises:

a. a standalone encryption development station, herein referred to as a Class 8 CPU (102), having a software encryption development library to uniquely develop encryption technologies to generate an encrypted preamble binary file;

b. a standalone decryption development station, herein referred to as a Class 9 CPU (103), having a software decryption library to uniquely develop decryption technologies to generate a decryption scheme for decrypting the encrypted preamble binary file; and c. a licensing system preamble executable CPU, herein referred to as a Class 10 CPU (104), for storing, developing and maintaining a preamble binary source code from which the preamble binary file (200) is developed.

9. The method of claim 8, wherein the encrypted preamble binary file is transmitted from the licensing software engine (101) to the Class 7 CPU (105) instead of the preamble binary file (200).

10. The method of claim 7, wherein the preamble binary file (200) stored on the Class 7 CPU (105) is downloaded to one or more Class 1 CPUs (106), wherein each Class 1 CPU (106) develops one or more software algorithms to be preambled by the system.

11. The method of claim 7, wherein the software algorithm is disabled when an attempt to execute the software algorithm is determined to be unauthorized.

\* \* \* \* \*